Sept. 20, 1971   J. L. MOSSEY   3,605,957
ADJUSTER MECHANISM
Filed March 24, 1969   2 Sheets-Sheet 2
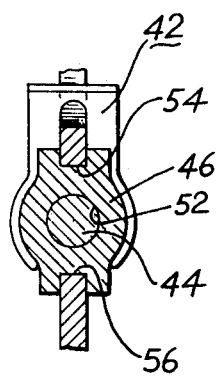
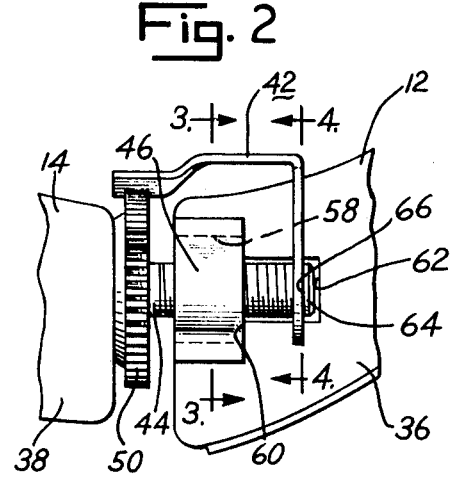
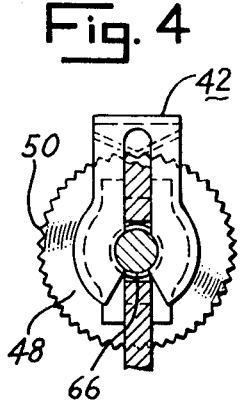
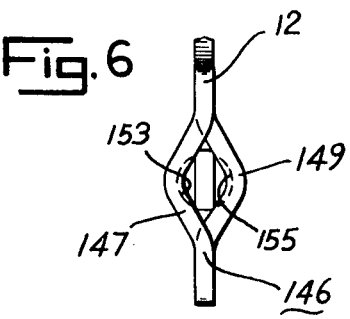
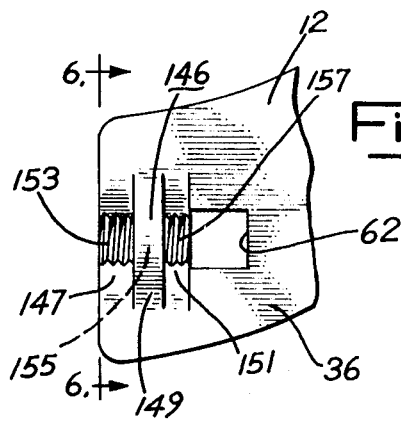
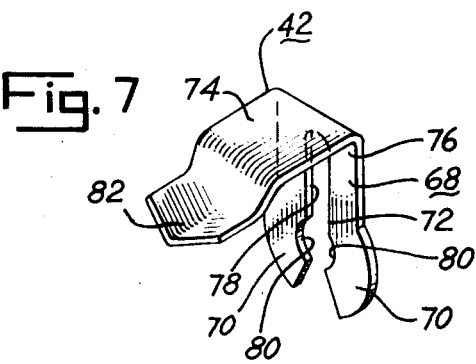
INVENTOR.
JOSEPH L. MOSSEY
BY
Plante, Arens, Hartz, Hix and Smith
ATTORNEYS ЗАЯ,605,957
Patented Sept. 20, 1971

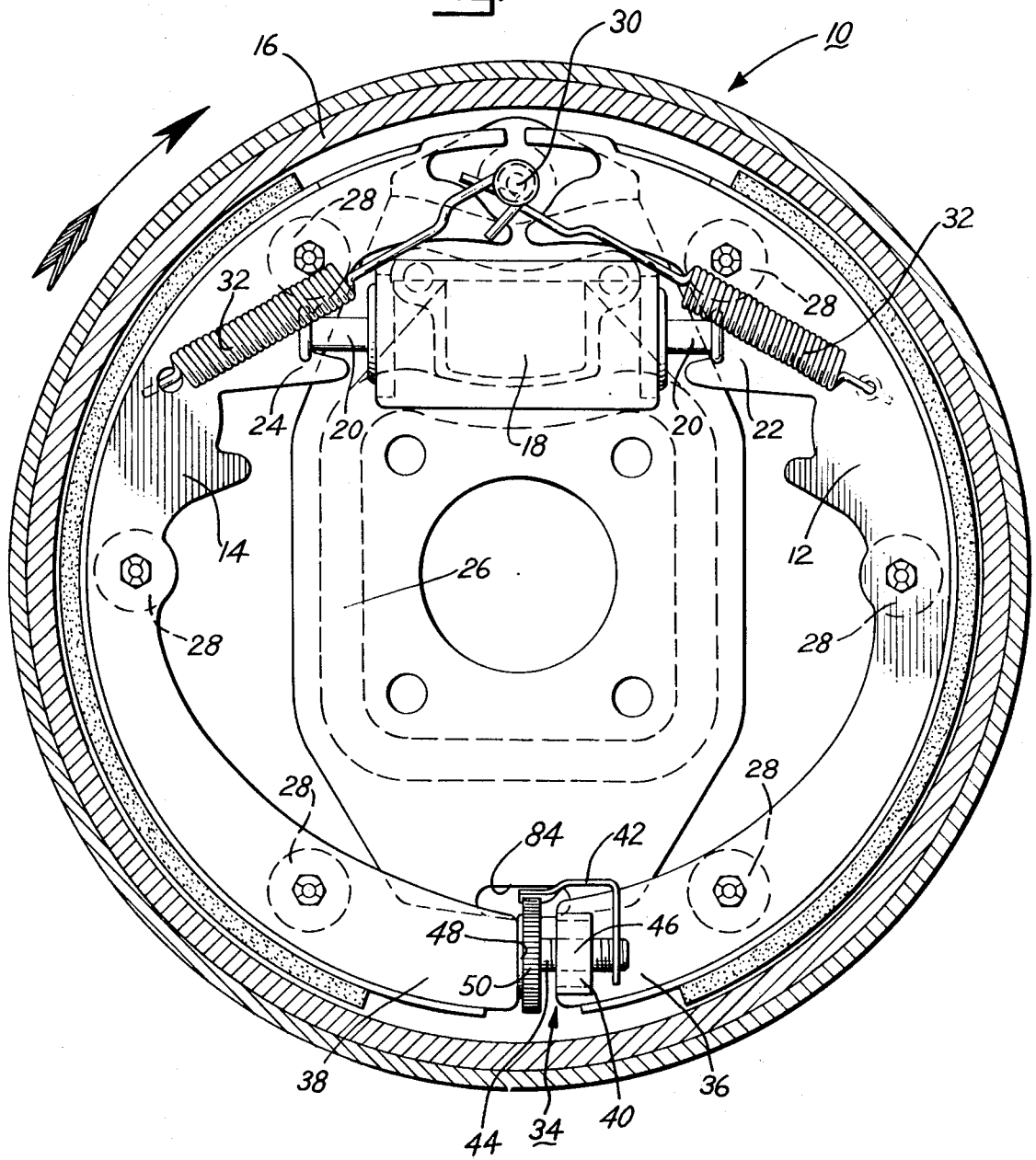

3,605,957
ADJUSTER MECHANISM
Joseph L. Mossey, South Bend, Ind., assignor to
The Bendix Corporation
Filed Mar. 24, 1969, Ser. No. 809,859
Int. Cl. F16d 65/46
U.S. Cl. 188—79.5
3 Claims

ABSTRACT OF THE DISCLOSURE

A brake equipped with an adjuster mechanism interposed between adjacent ends of a pair of brake shoes to compensate for shoe wear, comprising an extendible strut interconnecting the unanchored ends of said brake shoes and a locking means for controlling the extension of said strut.

SUMMARY OF THE INVENTION

It is an object of this invention to provide an adjuster mechanism having a more simplified construction when compared to existing devices.

It is an object of this invention to provide an adjuster mechanism that has improved reliability in terms of its environmental use.

It is an object of this invention to provide an improved adjuster mechanism that employs a minimum number of parts and that is economical to manufacture and assemble.

It is an object of this invention to provide an improved adjuster mechanism that is readily serviceable, adjustable or replaceable from an end-item usage viewpoint.

Other objects and features of the invention will be apparent from the following description of the adjuster mechanism taken in connection with the acompanying drawings.

BRIEF DESCRIPTION OF THE DRAWINGS

FIG. 1 is a plan view of a brake assembly depicting the adjuster mechanism of this invention;

FIG. 2 is an enlarged view of the adjuster mechanism;

FIG. 3 is a sectional view taken along line 3—3 of FIG. 2;

FIG. 4 is a sectional view taken along line 4—4 of FIG. 2;

FIG. 5 is a modified form of the invention shown in FIG. 2;

FIG. 6 is a sectional view taken along line 6—6 of FIG. 5; and

FIG. 7 is an isometric view of the locking means associated with this invention.

DESCRIPTION OF THE PREFERRED EMBODIMENT

Referring now to the drawings, and particularly FIG. 1 thereof, the numeral 10 represents a drum brake provided with brake shoes 12 and 14, which are urged against a drum 16 in any suitable manner such, for example, as by a hydraulic wheel cylinder 18. The wheel cylinder 18 provides the actuating means for moving the shoes into engagement with the drum. The wheel cylinder 18 is conventional in form and is equipped with connecting links 20 which engage the respective ends 22 and 24 of the shoes 12 and 14. The shoes 12 and 14 are held in sliding engagement against a backing plate 26 by a plurality of hold-down devices 28, which pass through the respective brake shoes. A fixed anchor member 30 is secured to the backing plate 26 to receive the braking torque of the brake shoes through one or the other of the shoe ends 22 and 24, depending upon the direction of rotation of the drum 16. If the drum 16 is rotating in a clockwise direction (as shown by the arrow) the two shoes 12 and 14 anchor as a unit at the end of shoe 14 against the fixed anchor member 30. Springs 32 are connected between the anchor member 30 and the ends 22 and 24, respectively, of the brake shoes 12 and 14 to thereby hold said shoes in a retracted position against the anchor member 30, and thus, out of contact with the drum 16.

A brake shoe adjuster mechanism 34 is interposed between ends 36 and 38 of the shoes 12 and 14, respectively, for making the necessary adjustments to the shoes as they become worn. The adjuster 34 includes an extendible strut 40 for interconnecting said unanchored ends 36 and 38 of said brake shoes, and a locking means 42. The extendible strut 40 comprises a rotatable portion 44 and a nonrotatable portion 46. A rotary wheel 48 having a serrated periphery 50 is rigidly connected to one end of said rotatable portion 44 to induce extension of said rotatable portion 44 with respect to said non-rotatable portion 46 in response to rotation of said rotary wheel 48. As may be seen in FIGS. 2 and 3, the rotatable portion 44 is threaded for rotatable cooperation with the non-rotatable portion 46. The non-rotatable portion 46 has a threaded bore 52 therethrough for receiving said portion 44. The non-rotatable portion 46 further includes radially extending bifurcated portions 54 and 56 for slidable insertion into slot 58, formed in the web of brake shoe 12 on unanchored end 36. The slot 58 has a partially closed end, forming a ledge 60 against which the non-rotatable portion 46 abuts to limit its axial insertion in said slot 58. It is noted that end 38 of brake shoe 14 abuts the rotary wheel 48 and exerts a force through said rotatable portion 44 to preload said non-rotatable portion 46 against said ledge 60. Another slot 62 is formed in the web of said shoe 12 to receive end 64 of the rotatable portion 44 prior to any extension of said portion 44.

As may be seen best in FIGS. 2 and 4, the locking means 42 is carried on end 64 of the rotatable portion 44 in an annular groove 66. With reference now specifically to FIG. 7, the locking means 42 comprises a bifurcated portion 68 having pincer-like arms 70 on one end 72 and a pawl portion 74 extending transverse from its other end 76. The bifurcated portion 68 is formed with a slot 78 which when installed, as shown in FIG. 2, straddles the web of brake shoe 12. The pincer-like arms 70 have arcuate interior surfaces 80, intersecting and extending from the sides of slot 78, which are resiliently preloaded toward each other to grip the annular groove 66 upon installation therewith. The pawl portion 74 has a face portion 82 which is resiliently preloaded against the serrated periphery 50 of the rotary wheel 48. The face portion 82 is generally V-shaped for positive engagement with the serrations of the serrated periphery 50. As may be seen best in FIG. 4, the slot 78 of the bifurcated portion 68 is bidirectionally engageable with the web of said shoe 12 to preclude rotation of said locking means 42 in response to a rotation of the rotary wheel 48. It is further noted that as the rotatable portion 44 is extended in response to rotation of said wheel 48, the face portion 82 maintains the same axial relationship with respect to the serrated periphery 50 of the rotary wheel 48 since the entire locking means 42 is carried in annular groove 66, and thus, travels axially with the rotatable portion 44.

MODE OF OPERATION OF THE PREFERRED EMBODIMENT

The brake shoe adjuster mechanism 34 is operable in response to a manual rotation of the rotary wheel 48. Upon continued applications of the vehicle brakes, the lining associated with brake shoes 12 and 14 will wear. This wear is noticeable to the operator of the vehicle since additional brake pedal travel will be required to effect a braking application. To reset the position of the brake shoes relative to the brake drum 16, a tool is inserted through an opening 84 in the backing plate 26 to engage an individual serration of the serrated periphery 50. Leverage of the tool against the individual serration will overcome the resilient preload of the face portion 82 against the serrations and cause the rotary wheel 48 to rotate, which, in turn, rotates the rotatable portion 44 with respect to said non-rotatable portion 46. This rotary motion between portions 44 and 46 extends the adjuster mechanism 34 to reposition the brake shoes with respect to the drum.

DESCRIPTION OF THE MODIFIED EMBODIMENT

Referring now to FIGS. 5 and 6, the invention is shown in a modified form wherein the non-rotatable portion is made integral with the web of brake shoe 12 and is shown generally by numeral 146. Since the remainder of the structure of the modified embodiment is identical to that of the preferred embodiment the same identifying numerals are used. The nonrotatable portion 146 is comprised of arcuate portions 147, 149 and 151 that are formed with threaded portions 153, 155 and 157 for threadably receiving the rotatable portion 44 (not shown). The remaining structure used with the modified embodiment is identical to that shown and described in the preferred embodiment and does not need further explanation.

While the specific details have been herein shown and described, the invention is not confined thereto, as other substitutions can be made within the spirit and scope of the invention.

I claim:
1. A brake assembly comprising:
   a pair of brake shoes;
   a fixed anchor to which each shoe is operatively connected at one end;
   an adjuster mechanism for said shoes comprising an extendible strut interconnecting the unanchored ends of said brake shoes; and
   a locking means;
   said extendible strut including a rotatable portion and a non-rotatable portion;
   a rotary wheel having a serrated periphery operatively connected to one end of said rotatable portion to induce extension of said strut upon rotation of said wheel;
   said non-rotatable portion being carried by one of said unanchored shoe ends;
   said locking means carried on the other end of said rotatable portion;
   said locking means being operatively engageable with said one of said unanchored shoe ends and preloaded against said serrated periphery to preclude rotation of said rotary wheel;
   said locking means comprising a bifurcated portion having pincer-like arms on one end and a pawl extending transverse from said other end;
   said pawl portion having a face portion resiliently preloaded against said serrated periphery of said rotary wheel;
   said bifurcated portion straddling a web of said one of said unanchored shoe ends;
   said pincer-like arms being carried in an annular groove on said rotatable member;
   said bifurcated portion being bidirectionally engageable with said web to preclude rotation of said locking means with respect to said rotary wheel.

2. A locking means as recited in claim 1, wherein said face portion of said pawl is generally V-shaped.

3. A locking means as recited in claim 1, wherein said pincer-like arms are resiliently preloaded against said rotatable member in said annular groove.

References Cited

UNITED STATES PATENTS

| | | | |
|---|---|---|---|
| 1,862,278 | 6/1932 | Parker | 188—79.5(SC) |
| 1,865,524 | 7/1932 | La Brie | 188—79.5(SC) |
| 1,872,197 | 8/1932 | Van Buskirk | 188—79.5(SC) |
| 2,536,410 | 1/1951 | Anderson | 188—79.5(SO) |
| 2,822,892 | 2/1958 | Clark | 188—79.5(SO) |

DUANE A. REGER, Primary Examiner

U.S. Cl. X.R.

188—196